(12) United States Patent
Bushey et al.

(10) Patent No.: US 7,836,405 B2
(45) Date of Patent: Nov. 16, 2010

(54) METHOD FOR INTEGRATING USER MODELS TO INTERFACE DESIGN

(75) Inventors: Robert R. Bushey, Cedar Park, TX (US); Thomas Deelman, Cedar Park, TX (US); Jennifer M. Mauney, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 0 days.

(21) Appl. No.: 12/405,713

(22) Filed: Mar. 17, 2009

(65) Prior Publication Data

US 2009/0177983 A1    Jul. 9, 2009

Related U.S. Application Data

(63) Continuation of application No. 11/448,049, filed on Jun. 7, 2006, now Pat. No. 7,526,731, which is a continuation of application No. 09/578,904, filed on May 26, 2000, now Pat. No. 7,086,007.

(60) Provisional application No. 60/136,406, filed on May 27, 1999.

(51) Int. Cl.
*G06F 3/00* (2006.01)
*G06F 3/14* (2006.01)

(52) U.S. Cl. .................. 715/762; 715/744; 715/745; 715/747; 705/43; 717/177; 725/47

(58) Field of Classification Search .......... 715/700, 715/741–748, 762, 764, 765, 866; 705/26, 705/40, 42, 43; 717/174, 176, 177, 178; 725/45, 46, 47, 132
See application file for complete search history.

(56) References Cited

U.S. PATENT DOCUMENTS

| | | | |
|---|---|---|---|
| 4,310,727 A | 1/1982 | Lawser |
| 4,694,483 A | 9/1987 | Cheung |
| 4,761,542 A | 8/1988 | Kubo et al. |
| 4,922,519 A | 5/1990 | Daudelin |
| 4,930,077 A | 5/1990 | Fan |
| 4,964,077 A | 10/1990 | Eisen et al. |
| 5,115,501 A | 5/1992 | Kerr |

(Continued)

FOREIGN PATENT DOCUMENTS

GB    2367167    3/2002

(Continued)

OTHER PUBLICATIONS

Kelly, "From Intelligent Call Routing to Intelligent Contact Management," Call Center Solutions, v19, n3, (Sep. 2000).

(Continued)

*Primary Examiner*—X. L Bautista
(74) *Attorney, Agent, or Firm*—Greenblum & Bernstein P.L.C.

(57) ABSTRACT

Designing user interfaces for users in a user population includes modeling behaviorally distinct groups of the users and customizing the user interfaces based on either or both interactive testing by the users and modeling the behaviorally distinct groups of the users. The user population is categorized into the behaviorally distinct groups of the users based on predetermined characteristics and behaviors for the users.

19 Claims, 2 Drawing Sheets

U.S. PATENT DOCUMENTS

| | | |
|---|---|---|
| 5,181,259 A | 1/1993 | Rorvig |
| 5,204,968 A | 4/1993 | Parthasarathi |
| 5,206,903 A | 4/1993 | Kohler et al. |
| 5,263,167 A | 11/1993 | Conner, Jr. et al. |
| 5,299,260 A | 3/1994 | Shaio |
| 5,311,422 A | 5/1994 | Loftin et al. |
| 5,323,452 A | 6/1994 | Dickman et al. |
| 5,327,529 A | 7/1994 | Fults et al. |
| 5,335,268 A | 8/1994 | Kelly, Jr. et al. |
| 5,335,269 A | 8/1994 | Steinlicht |
| 5,371,673 A | 12/1994 | Fan |
| 5,388,198 A | 2/1995 | Layman et al. |
| 5,420,975 A | 5/1995 | Blades et al. |
| 5,479,488 A | 12/1995 | Lenning et al. |
| 5,495,567 A | 2/1996 | Iizawa et al. |
| 5,500,795 A | 3/1996 | Powers et al. |
| 5,519,772 A | 5/1996 | Akman et al. |
| 5,530,744 A | 6/1996 | Charalambous et al. |
| 5,533,107 A | 7/1996 | Irwin et al. |
| 5,535,321 A | 7/1996 | Massaro et al. |
| 5,537,470 A | 7/1996 | Lee |
| 5,553,119 A | 9/1996 | McAllister et al. |
| 5,561,711 A | 10/1996 | Muller |
| 5,566,291 A | 10/1996 | Boulton et al. |
| 5,586,060 A | 12/1996 | Kuno et al. |
| 5,586,171 A | 12/1996 | McAllister et al. |
| 5,586,219 A | 12/1996 | Yufik |
| 5,594,791 A | 1/1997 | Szlam et al. |
| 5,600,781 A | 2/1997 | Root et al. |
| 5,615,323 A | 3/1997 | Engel et al. |
| 5,633,909 A | 5/1997 | Fitch |
| 5,657,383 A | 8/1997 | Gerber et al. |
| 5,659,724 A | 8/1997 | Borgida et al. |
| 5,666,400 A | 9/1997 | McAllister et al. |
| 5,668,856 A | 9/1997 | Nishimatsu et al. |
| 5,671,351 A | 9/1997 | Wild et al. |
| 5,675,707 A | 10/1997 | Gorin et al. |
| 5,684,870 A | 11/1997 | Maloney et al. |
| 5,684,872 A | 11/1997 | Flockhart et al. |
| 5,706,334 A | 1/1998 | Balk et al. |
| 5,710,884 A | 1/1998 | Dedrick |
| 5,727,950 A | 3/1998 | Cook et al. |
| 5,729,600 A | 3/1998 | Balha et al. |
| 5,734,709 A | 3/1998 | DeWitt et al. |
| 5,740,549 A | 4/1998 | Reilly et al. |
| 5,757,644 A | 5/1998 | Jorgensen et al. |
| 5,758,257 A | 5/1998 | Herz et al. |
| 5,771,276 A | 6/1998 | Wolf |
| 5,790,117 A | 8/1998 | Halviatti et al. |
| 5,793,368 A | 8/1998 | Beer |
| 5,802,526 A | 9/1998 | Fawcett et al. |
| 5,806,060 A | 9/1998 | Borgida et al. |
| 5,808,908 A | 9/1998 | Ghahramani |
| 5,809,282 A | 9/1998 | Cooper et al. |
| 5,812,975 A | 9/1998 | Komori et al. |
| 5,819,221 A | 10/1998 | Kondo et al. |
| 5,821,936 A | 10/1998 | Shaffer et al. |
| 5,822,397 A | 10/1998 | Newman |
| 5,822,744 A | 10/1998 | Kesel |
| 5,825,856 A | 10/1998 | Porter et al. |
| 5,825,869 A | 10/1998 | Brooks et al. |
| 5,832,428 A | 11/1998 | Chow et al. |
| 5,832,430 A | 11/1998 | Lleida et al. |
| 5,835,565 A | 11/1998 | Smith et al. |
| 5,848,396 A | 12/1998 | Gerace |
| 5,864,605 A | 1/1999 | Keshav |
| 5,864,844 A | 1/1999 | James et al. |
| 5,870,308 A | 2/1999 | Dangelo et al. |
| 5,872,865 A | 2/1999 | Normile et al. |
| 5,873,068 A | 2/1999 | Beaumont et al. |
| 5,875,108 A | 2/1999 | Hoffberg et al. |
| 5,884,029 A | 3/1999 | Brish, II et al. |
| 5,899,992 A | 5/1999 | Iyer et al. |
| 5,903,641 A | 5/1999 | Tonisson |
| 5,905,774 A | 5/1999 | Tatchell et al. |
| 5,920,477 A | 7/1999 | Hoffberg et al. |
| 5,923,745 A | 7/1999 | Hurd |
| 5,930,764 A | 7/1999 | Melchione et al. |
| 5,943,416 A | 8/1999 | Gisby |
| 5,953,406 A | 9/1999 | LaRue et al. |
| 5,963,965 A | 10/1999 | Vogel |
| 5,974,253 A | 10/1999 | Nahaboo et al. |
| 5,991,735 A | 11/1999 | Gerace |
| 5,999,611 A | 12/1999 | Tatchell et al. |
| 5,999,908 A | 12/1999 | Abelow |
| 6,014,638 A | 1/2000 | Burge et al. |
| 6,016,336 A | 1/2000 | Hanson |
| 6,026,381 A | 2/2000 | Barton, III et al. |
| 6,032,129 A | 2/2000 | Greef et al. |
| 6,035,283 A | 3/2000 | Rofrano |
| 6,035,336 A | 3/2000 | Lu et al. |
| 6,038,560 A | 3/2000 | Wical |
| 6,044,355 A | 3/2000 | Crockett et al. |
| 6,052,693 A | 4/2000 | Smith et al. |
| 6,055,542 A | 4/2000 | Nielsen et al. |
| 6,058,163 A | 5/2000 | Pattison et al. |
| 6,058,179 A | 5/2000 | Shaffer et al. |
| 6,058,435 A | 5/2000 | Sassin et al. |
| 6,061,433 A | 5/2000 | Polcyn et al. |
| 6,067,538 A | 5/2000 | Zorba et al. |
| 6,088,429 A | 7/2000 | Garcia |
| 6,099,320 A | 8/2000 | Papadopoulos |
| 6,104,790 A | 8/2000 | Narayanaswami |
| 6,128,380 A | 10/2000 | Shaffer et al. |
| 6,128,624 A | 10/2000 | Papierniak et al. |
| 6,134,315 A | 10/2000 | Galvin |
| 6,134,530 A | 10/2000 | Bunting et al. |
| 6,148,063 A | 11/2000 | Brennan et al. |
| 6,157,808 A | 12/2000 | Hollingsworth |
| 6,160,877 A | 12/2000 | Tatchell et al. |
| 6,161,130 A | 12/2000 | Horvitz et al. |
| 6,163,607 A | 12/2000 | Bogart et al. |
| 6,166,732 A | 12/2000 | Mitchell et al. |
| 6,170,011 B1 | 1/2001 | Macleod Beck et al. |
| 6,173,053 B1 | 1/2001 | Bogart et al. |
| 6,173,279 B1 | 1/2001 | Levin et al. |
| 6,201,948 B1 | 3/2001 | Cook et al. |
| 6,212,502 B1 | 4/2001 | Ball et al. |
| 6,219,665 B1 | 4/2001 | Shiomi |
| 6,230,197 B1 | 5/2001 | Beck et al. |
| 6,236,395 B1 | 5/2001 | Sezan et al. |
| 6,236,955 B1 | 5/2001 | Summers |
| 6,236,990 B1 | 5/2001 | Geller et al. |
| 6,243,375 B1 | 6/2001 | Speicher |
| 6,249,579 B1 | 6/2001 | Bushnell |
| 6,263,052 B1 | 7/2001 | Cruze |
| 6,269,153 B1 | 7/2001 | Carpenter et al. |
| 6,278,976 B1 | 8/2001 | Kochian |
| 6,282,404 B1 | 8/2001 | Linton |
| 6,289,084 B1 | 9/2001 | Bushnell |
| 6,292,909 B1 | 9/2001 | Hare |
| 6,295,551 B1 | 9/2001 | Roberts et al. |
| 6,296,376 B1 | 10/2001 | Kondo et al. |
| 6,308,172 B1 | 10/2001 | Agrawal et al. |
| 6,330,326 B1 | 12/2001 | Whitt |
| 6,332,154 B2 | 12/2001 | Beck et al. |
| 6,334,627 B1 | 1/2002 | Heym et al. |
| 6,336,109 B2 | 1/2002 | Howard |
| 6,338,050 B1 | 1/2002 | Conklin et al. |
| 6,349,290 B1 | 2/2002 | Horowitz et al. |
| 6,353,661 B1 | 3/2002 | Bailey, III |
| 6,353,825 B1 | 3/2002 | Ponte |
| 6,357,017 B1 | 3/2002 | Bereiter et al. |
| 6,366,879 B1 | 4/2002 | Coxhead et al. |

| | | |
|---|---|---|
| 6,374,260 B1 | 4/2002 | Hoffert et al. |
| 6,389,403 B1 | 5/2002 | Dorak, Jr. |
| 6,389,538 B1 | 5/2002 | Gruse et al. |
| 6,400,807 B1 | 6/2002 | Hewitt et al. |
| 6,405,149 B1 | 6/2002 | Tsai et al. |
| 6,405,159 B2 | 6/2002 | Bushey et al. |
| 6,405,170 B1 | 6/2002 | Phillips et al. |
| 6,411,687 B1 | 6/2002 | Bohacek et al. |
| 6,434,714 B1 | 8/2002 | Lewis et al. |
| 6,448,980 B1 | 9/2002 | Kumar et al. |
| 6,483,523 B1 | 11/2002 | Feng |
| 6,487,277 B2 | 11/2002 | Beyda et al. |
| 6,516,051 B2 | 2/2003 | Sanders |
| 6,564,197 B2 | 5/2003 | Sahami et al. |
| 6,587,127 B1 | 7/2003 | Leeke et al. |
| 6,598,022 B2 | 7/2003 | Yuschik |
| 6,618,715 B1 | 9/2003 | Johnson et al. |
| 6,624,803 B1 | 9/2003 | Vanderheiden et al. |
| 2001/0014863 A1 | 8/2001 | Wiiliams, III |
| 2001/0014868 A1 | 8/2001 | Herz et al. |
| 2001/0041562 A1 | 11/2001 | Elsey et al. |
| 2002/0055868 A1 | 5/2002 | Dusevic et al. |
| 2002/0083025 A1* | 6/2002 | Robarts et al. ............ 706/12 |
| 2002/0133394 A1 | 9/2002 | Bushey et al. |
| 2002/0196277 A1 | 12/2002 | Bushey et al. |
| 2003/0026409 A1 | 2/2003 | Bushey et al. |
| 2003/0143981 A1 | 7/2003 | Kortum et al. |
| 2003/0156133 A1 | 8/2003 | Martin et al. |
| 2003/0156706 A1 | 8/2003 | Koehler et al. |
| 2003/0158655 A1 | 8/2003 | Obradovich et al. |
| 2004/0006473 A1 | 1/2004 | Mills et al. |
| 2004/0032935 A1 | 2/2004 | Mills et al. |
| 2004/0042592 A1 | 3/2004 | Knott et al. |
| 2004/0240635 A1 | 12/2004 | Bushey et al. |
| 2005/0035582 A1 | 2/2005 | Kim |
| 2005/0082807 A1 | 4/2005 | Kwon |
| 2007/0061735 A1* | 3/2007 | Hoffberg et al. ............ 715/744 |

FOREIGN PATENT DOCUMENTS

| | | |
|---|---|---|
| WO | 00/33548 | 6/2000 |
| WO | 00/73968 | 12/2000 |
| WO | 03/013111 | 2/2003 |

OTHER PUBLICATIONS

"Call Center Roundup," Teleconnect, (Dec. 1998).
"Call Centers: sales, service and competitive advantage," Canadian Business, v70, n2, (Feb. 1997).
Foster, "Advanced Definity call centers: Working for you and your customers," AT&T Technology, v9, n2, (1994).
Ameritech Corp., "Ameritech Phone-Based UI Standards: Dialogue Design", Ameritech.com/corporate/testtown/library/standard/pbix4.html, (1998).
InterVoiceBrite, Inc., "AgentConnect Call Center Platform Brochure", no date available.
"ACD Learning Center Tutorial Series", ACD Call Center Online Learning Center, call-center.net/ivr-series.htm (1998-1999).
"Customer Management Technology", TeleTech, teletech.com/solutions/cmt.htm, (Dec. 2001).
"Products & Services—Interactive Voice Response (IVR)", Prairie Systems, prairiesys.com/PSI/p_s_interactive_sol.htm, (2001).
"RVS Voice", iMessaging Systems, Inc., imessagingsystems.com/imsprods/rvsvoice/rvsvoice.htm.
"What's Next in Interactive Voice Response", International Nortel Networks Meridian Users Group, innmug.org/information/kirvan.html, InnTouch, (Dec. 2000).
Kellner et al., "PADIS—An automatic telephone switchboard and directory information system," Speech Communication, (Oct. 1997).
Carpenter et al., "Natural Language Call Routing: a Robust, Self-Organizing Approach," Lucent Technologies Bell Laboratories, (1998).
"Lucent Technologies announces trial of natural language call routing technology," a press release dated (Dec. 1997).
Ricardi et al., "A spoken language system for automated call routing," *IEEE International Conference on Acoustics, Speech, and Signal Processing*, AT&T Bell Labs, (1997).
Kobayashi, "Information Presentation based on Individual User Interests," Second International Conference, IEEE, pp. 375-383, (1998).
Sgouros, "Dynamic Dramatization of Multimedia Story Presentations", *ACM*, pp. 87-94, (1997).
Murtaugh, "The Automatist Storytelling System," Massachusetts Institute of Technology, Masters Thesis, (1996).
Brooks, "Do Agent Stories Use Rocking Chairs: The Theory and Implementation of One Model for Computational Narrative," *Processing's of the Fourth ACM International Multimedia Conference on Intelligent User Interfaces*, ACM Press, (1996).
Maybury, *Intelligent Multi-Media Interfaces*, AAAI/MIT Press, Chapter 5: S.K. Fiener et al., "Automating the Generation of Coordinated Multimedia Explanations," (1993).
Szekely, "Retrospective and Challenges for Model-Based Reasoning," USC Information Sciences Institute, Marina del Rey, CA, 1996.
Stanfill et al., Toward Memory-Based Reasoning, *Communications of the ACM*, vol. 29, No. 12, ACM Press, (Dec. 1986).
Orwant, "Doppleganger Goes to School: Machine Learning for User Modeling," MIT MS Thesis, (Sep. 1993).
Orwant, "For want of a bit the user was lost: Cheap User Modeling," *IBM Systems Journal*, vol. 35, Nos. 3 & 4, pp. 398-416, (1996).
Shardanand, "Social Information Filtering for Music Recommendation," MIT MS Thesis, (1994).
Meyer, From Animals to Animats 2 Proceedings of the Second International Conference on Simulation of Adaptive Behavior, MIT Media Laboratory, Behavior Based Artificial Intelligence, (1992).
Leiberman et al., "Let's Browse: A Collaborative Web Browsing Agent", Proceedings of IUI 99. CPP Conference Paper, 5 pages, (Jan. 1999).

* cited by examiner

METHOD FOR INTEGRATING USER MODELS TO INTERFACE DESIGN

CROSS-REFERENCE TO RELATED APPLICATIONS

This is a continuation application of pending U.S. patent application Ser. No. 11/448,049, filed Jun. 7, 2006, which is a continuation of U.S. patent application Ser. No. 09/578,904, filed May 26, 2000, issued as U.S. Pat. No. 7,086,007 on Aug. 1, 2006, which claims the benefit of U.S. Provisional Application No. 60/136,406, filed May 27, 1999, the disclosures of which are herein expressly incorporated by reference in their entireties.

The present invention also relates to a method described in commonly-assigned co-pending U.S. patent application Ser. No. 09/089,403, "A Method for Categorizing, Describing, and Modeling Types of Systems Users", filed Jun. 3, 1998, to R. Bushey et al., and to a method described in commonly-assigned and co-pending U.S. patent application Ser. No. 09/303,622, "Methods for Intelligent Routing of Customer Requests Using Customer and Agent Models", filed May 3, 1999, to R. Bushey et al., the subject matter of both of which is expressly incorporated by reference herein.

BACKGROUND OF THE INVENTION

1. Field of the Invention

The present invention relates to the field of user interface design and analysis of human factors which are considered pertinent during the development stages of the user interface. In particular, this invention considers human factors, through behavioral modeling methods, and then incorporates such factors into the iterative design stage of interface development.

2. Description of Background Information

The traditional view of user performance during interface design and testing is that variability in responses, preferences, and behavior reflects poor design. The common knowledge and practice in the industry is to represent the user population as having a single set of characteristics and behaviors. In current practice, this single set of characteristics and behaviors focuses on only one of three types: expert, novice, or composite. One group is represented to the exclusion of other groups' needs. This is a particularly inappropriate method of designing in that there is a substantial risk that very few users will be best accommodated by the interface. Subsequently, an interface is designed in such a way that variability would be reduced. As a consequence, the diversity of the user population is neglected and users' unique needs and preferences are effectively ignored.

The common knowledge and practice in the industry is twofold, First, it is common practice to take a single view of a user population, and second, to subsequently design system interfaces based on this view. For example, a system interface may be designed to accommodate the behavior of an expert user (e.g., customer service and sales representatives). Alternatively, interfaces can be designed to accommodate a novice user (e.g., interfaces used in automated teller machines for use by the general public). Thus, the current practice represents the user population with a single set of characteristics and behaviors. If users or agents are categorized in any way, they are done so in an informal manner, based primarily on the opinion and judgement of local operating management and not based on formal qualitative and quantitative models, statistical data, or similar objective empirical measures.

Since it is common practice to take a singular view of the user population, the interface is designed and tested to reflect average or prototypical end user performance. For instance, during usability testing it is typical to deem a workflow task or design implementation a failure if 5 of 10 users successfully perform the task or function even though the interface was designed superbly for 5 of the users Similarly, a design implementation is commonly deemed acceptable it 10 of 10 users performed adequately even though a closer examination may reveal that the majority of users reflected outstanding performance while the remaining subset could not display the required behavior. In both of these examples, the variability or diversity in performance is not considered during design or testing. Distinctive behaviors that may be desirable are not tracked, captured, or accommodated since the emphasis has commonly focused on accommodating average behavior. The testing and design phase of interface development does not capitalize upon, or accommodate, variability in performance primarily because management and systems engineers typically accept the singular view of one user-representation.

Capturing the behavioral diversity of the user population is the first of two necessary steps toward the design and deployment of systems and processes that accommodate the specific needs of the user (agent) and facilitate business goals. The second necessary step is systematically integrating the agent models to the design and engineering of user interfaces.

Traditionally, the diversity of a user population has not been taken into account during the iterative design stage of interface development. Rather, a system is typically designed with the simplistic view of the "average" or prototypical user in mind. This approach does not accommodate the entire range of behaviors and characteristics of the user population. This single-view may hinder performance of a large proportion of users, given that their specific needs are not accommodated and management and systems interface engineers are unable to capitalize on the unique behavioral qualities that could facilitate performance and achieve business goals.

A solution to this approach is to consider the range of behavioral characteristics of the entire user population during the design phase of interface development. This broad range of behavior is ideally captured through use of behavioral models. Once the user population is categorized into a reasonable number of groups, the resultant qualitative and quantitative models can be integrated into system design and testing.

Prior art which discloses behavioral models are U.S. patent application Ser. No. 09/089,403, filed on Jun. 3, 1998, entitled "A Method for Categorizing, Describing, and Modeling Types of Systems Users" and provisional U.S. Patent Application No. 60/097,174, filed on Aug. 20, 1998, entitled "A Method for Intelligent Call Routing Utilizing a Performance Optimizing Calculation Integrating Customer and Agent Behavioral Models".

The Categorize Describe-Model (CDM) methodology, disclosed in U.S. patent application Ser. No. 09/089,403, is a technique used to categorize a diverse user population into a reasonable number of groups that share similar characteristics. The behaviors of users within these groups are then objectively described and subsequently quantitatively and qualitatively modeled. At any point in this process, the grouping characteristics may be validated and revised based on the data collected and modifications of bottom-line business goals. The end result of the CDM method is that a highly diverse user population is divided into a small number of behaviorally distinctive groups (e.g., 3-5 user-groups). The members of each group share similar characteristics and behaviors. In effect, by using the CDM methodology, the entire range of behavioral diversity of a user population can be captured and accommodated.

DETAILED DESCRIPTION OF THE INVENTION

Figure 1:
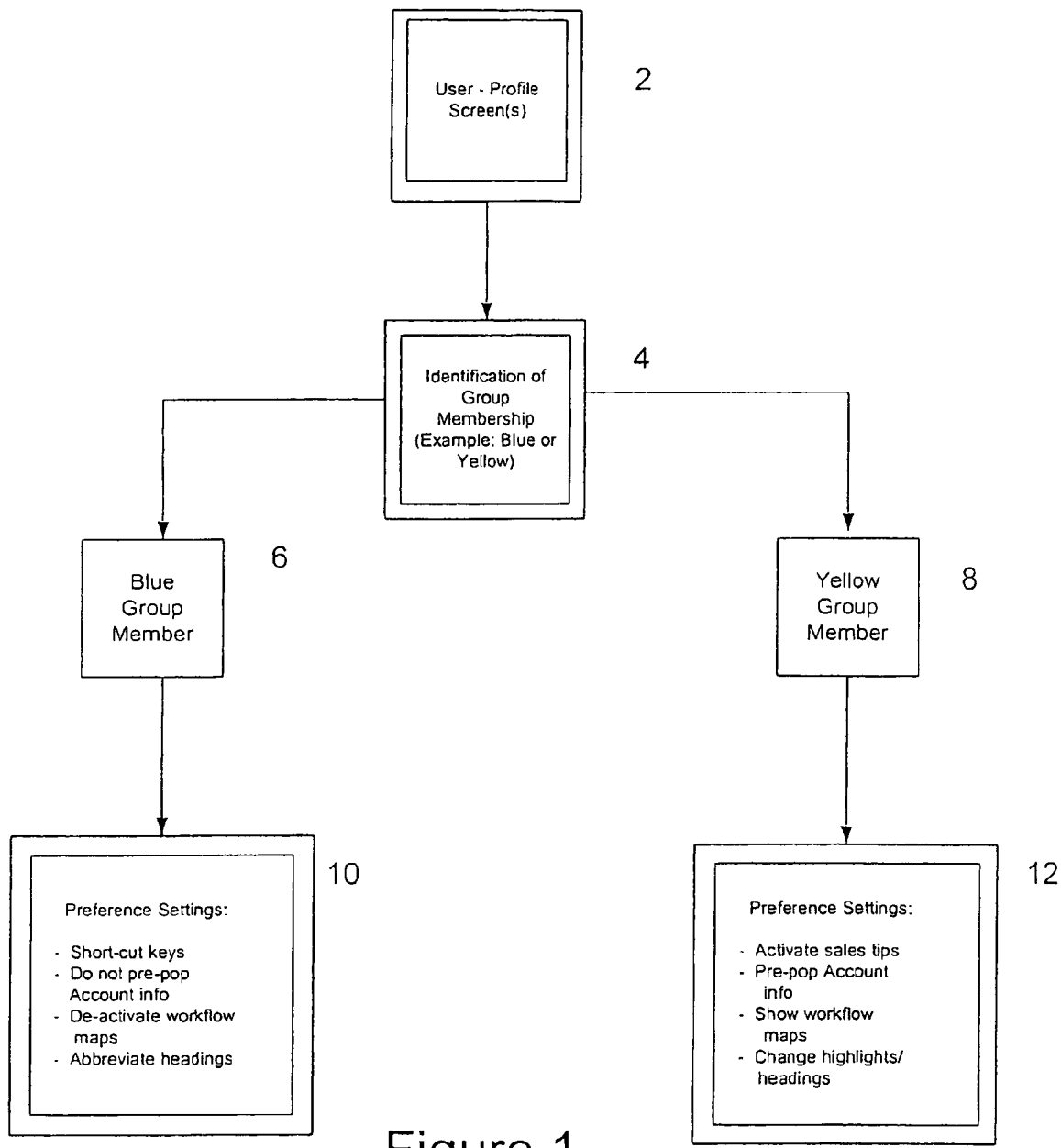
FIG. 1 illustrates a flow diagram of the interface customization selections entered on a user-profile screen, according to an aspect of the present invention.

An objective of the disclosed invention is to establish a method that systematically and thoroughly applies user models derived through the CDM method to the design and testing phase of interface development. Rather than assuming a single set of behaviors or characteristics that represents the user population, the CDM method categorizes the user population into a small number of behaviorally distinctive groups. The present invention then extends this process and applies it directly to interface design.

This unique approach to usability testing and systems design ensures that the range of needs and preferences of the entire user population (e.g., each group derived through the CDM method) is considered. Customizing usability testing for each user group and allowing for flexibility in performance, not simply considering "average" behavior, allows for an improved understanding of the users and improved interface design leading to improved performance.

In contrast to the traditional approach, applying the CDM method to interface design involves accommodating variability in performance, and capitalizing on the diversity within the user population. Application of the CDM method to design and testing involves tracking design requirements and implementations on micro and macro levels, documenting pre-determined user characteristics, capturing new user characteristics that emerge, accommodating diversity in performance and preference during testing, and customizing system display and navigation. This process ultimately facilitates the maintenance of user models to expedite future enhancements and business decisions.

The final objective and end-result is that customer/agent negotiations and call center operations are improved because the negotiation system interface is engineered to accommodate usability needs of the entire user population, targeted behaviors, and preferences that facilitate meeting business objectives.

According to an aspect of the present invention, a method for designing a customized user interface is provided that categorizes a user population into groups using qualitative and quantitative models, and applies the models into interface design, interactive testing, and system deployment. The step of categorizing a user population into groups using qualitative and quantitative models may be based upon Categorize-Describe-Model (CDM) methodology.

According to a further aspect of the present invention a method for designing a customized user interface is provided that includes categorizing at least two users, validating targeted user behaviors and preferences, capturing emergent behaviors and preferences, tracking design requirements and implementations, accommodating diversity in performance and preference during interactive testing, and customizing a user interface design to each of the at least two users.

Further aspects of the present invention include incorporating the user interface into the following hardware systems: a graphical user interface (GUI) of a sales and billing negotiation system; a telephone system, graphical user interface (GUI) provided on the Internet; a interactive graphic user interface (GUI) system; an automated teller machine; a computer operating system; or a television programming interface.

In another aspect of the present invention, a method for designing a customized user interface is presented that includes categorizing a user population into distinctive groups in which the users' behaviors are described, modeling the categorized user population using Categorize-Describe-Model (CDM) methodology, documenting and validating pre-determined user characteristics as indicated by initially grouping characteristics, including targeted behaviors and preferences, derived through said CDM methodology. The method also includes capturing new user characteristics that emerge, simultaneously tracking design requirements and implementations on both micro and macro levels, accommodating variability and diversity in performance and preference during iterative testing by integrating user-customization into a design by creating a user-profile in which the users select various navigation preferences and information display choices that can be applied throughout the interface, and developing a customized user interface as an end-product.

One embodiment of how a user's interface may be modified based on user-group membership is illustrated in FIG. 1. The initial step starts at a user-profile screen or multiple user-profile screens (2). A user profile screen is a segment of the interface where a user may configure or customize the interface to accommodate his/her needs.

Next, the CDM methodology would have pre-determined a user's behavioral characteristics and classified them into a specific user-group. In this example, the user would identify their group membership as the "blue" group (6) or "yellow" group (8). Ultimately, either the user or the system administrator would assign group membership at system log-on or registration.

Once the user identifies his/her group membership, the different functions (preference settings) within the interface are changed to accommodate the user-group's needs (10, 12). In this example, the user may also change his/her preference settings individually as well. Some examples of preference settings are: (1) short-cut keys—keys or macros that accelerate different functions; (2) pre-pop of account information—certain information that may be automatically presented on a screen at the users' discretion, such as account information; or (3) workflow maps—maps and help aids that indicate to the user what they should do during a negotiation. As an end result, the system interface would reflect functionality that is customized to the user's group membership (10, 12).

Figure 2:
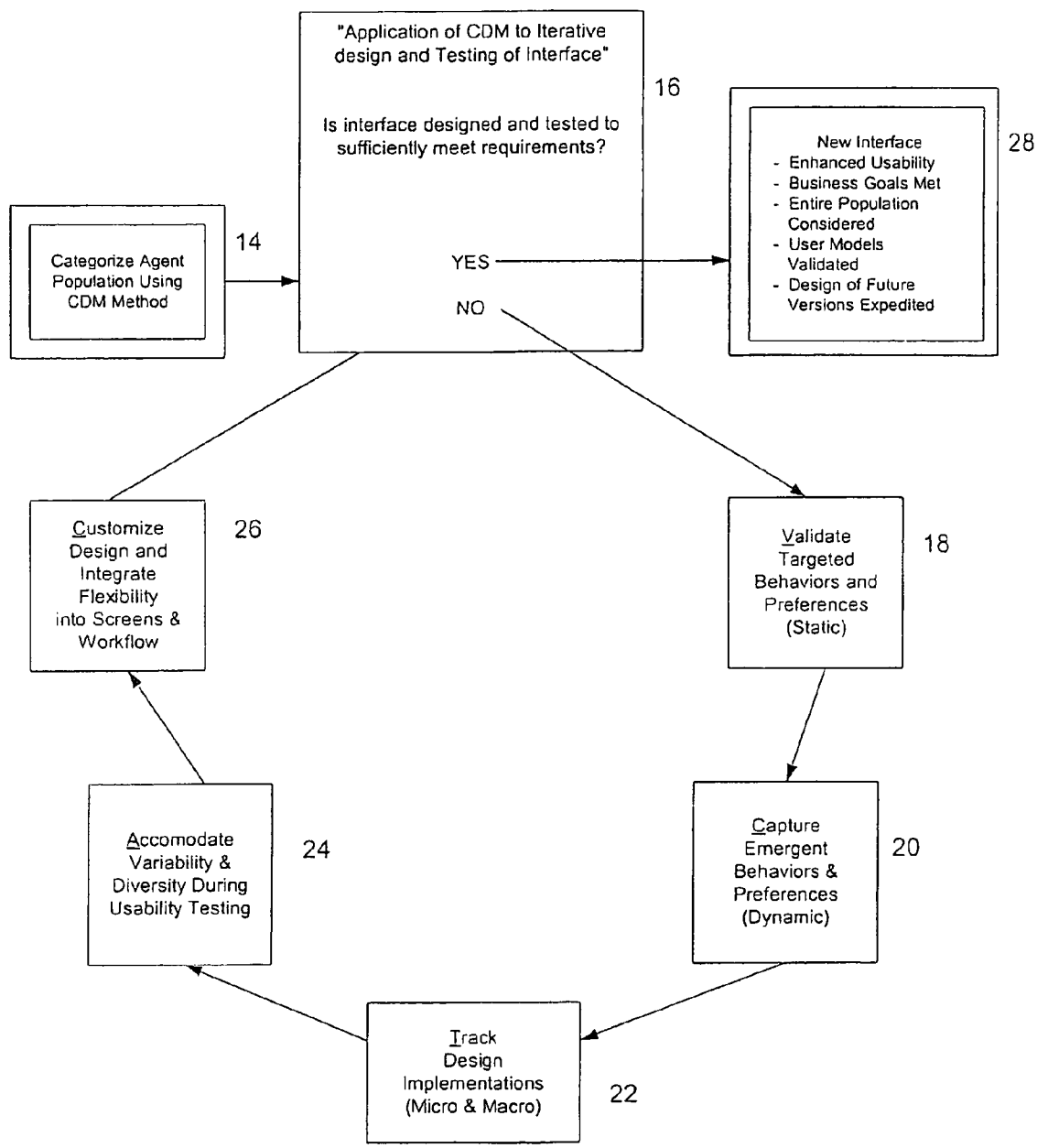
FIG. 2 illustrates a flow diagram of the VaCTAC method of applying user models to interface design, according to an aspect of the present invention.

FIG. 2 illustrates a preferred embodiment of how the CDM method is ideally applied to design and testing phases of interface development. As a preliminary step toward applying user models to design, the user population must be categorized into distinctive groups, their behaviors described, and subsequently modeled (14).

Once the CDM methodology is complete (14), the interface design process is implemented (16). The next series of boxes (shown in a clockwise arrangement; 16) depicts the application of the CDM method to interface design. Application of the CDM method to design and testing involves, first documenting and Validating pre-determined user characteristics as indicated by the initial grouping characteristics derived through the CDM method (18). This would include targeted behaviors and preferences, and is a static process.

Second, Capturing new user characteristics that emerge is essential, given that new behaviors and characteristics are imminent with a new or enhanced system and must be quantified to enhance the initial grouping characteristics (20).

Third, design requirements and implementations must be Tracked (22) on both micro (within individual screens) and macro levels (how design alternatives fit within the user's work-flow). Tracking design implementations on micro levels refers to the detailed consideration of individual components of the interface (e.g., the placement and functionality of certain buttons on an individual graphical user interface (GUI) screen). Tracking design implementations on macro levels refers to the consideration of how all the interface components, being collectively the entire interface design, matches with the goals and the tasks of the user.

Fourth, Accommodating variability and diversity in performance and preference during iterative testing is paramount to taking the unique needs of the user population into consideration when developing final design requirements (24).

Finally, an extension of the process of accommodating variability and diversity is to integrate appropriate user-Customization in to the design (26). This would be accomplished through creating a user-profile in which the user would select various navigation preferences and information display choices that would be applied throughout the interface. Such alternatives and choices are determined based on behavioral characteristics of the user groups (derived via CDM phase) and business decisions from operations/management personnel.

The entire process of applying user models to interface design is referred to as the VaCTAC method (Validate, Capture, Track, Accommodate and Customize). The end-product of this technique is a new interface (28) that: (a) has enhanced usability, (b) facilitates behaviors and preferences that are consistent to meeting business goals and operational decisions, (c) the broad range of usability needs of the entire population are addressed and capitalized upon by operations management, (d) results in revised, enhanced, and validated quantitative and qualitative user models, and (e) the design of future releases and enhancements would be expedited by the thorough knowledge of the user population gathered by this process.

To better understand the invention, it is important to describe in further detail how the CDM methodology may be applied to interface design. The first portion of data that contributes to this process is the "screenflow" analysis of the present invention. This analysis also helps to add detail to the qualitative user models and provides the level of detail necessary to create quantitative models of service representative behavior. The approach taken is to analyze specific call types based on the customer's initial request and how this request is ultimately resolved. These specific call types can then be analyzed to determine the prototypical navigation behavior used for that particular type of call.

A primary aspect of determining prototypical navigation behavior is to indicate the most common number, type, and sequence of interface screens visited during the particular customer/representative negotiation. A detailed description of this process and the results are provided below. The data used for this analysis was captured during side-by-side observations of service representatives.

In order to determine a prototypical screen-flow, it is necessary to identify call-types that are essentially identical to one another. For instance, all calls in which the customer requests "caller ID" to be added to their service, would be considered virtually identical to one another since the task of the service representative should be the same in all cases. To this end, the majority of calls observed were from two categories, namely, "order" and "information (info)" types of calls. The data captured that was used in identifying exactly what kind of calls fell within order and information given from the customer's opening statement (e.g., "I want to get a second telephone line for my computer modem") which was compared to the final resolution of the call (order, transfer, etc). It was determined that "information" types of calls included a wide variety of customer requests, so many in fact, that there was no single type of request that occurred frequently enough to warrant or allow subsequent analysis. However, there was sufficient consistency of customer requests under "order" call types to allow further analysis.

Therefore, all order type calls collected at call centers were categorized into sub-groups. A total of nine order call types were found, based on customers' opening statements and the observers' label of how the call was ultimately resolved. Four of the nine call types were subsequently analyzed, namely: new connects, moves, disconnect line, and caller ID. The problem and disconnect call types were not analyzed because further inspections of the screen flows indicated that these call types involved a wide range of navigation behavior that varied on a call-to-call basis. Therefore, a prototypical screen flow could not be determined for these call types. Additional line (ADL), call blocker, and name change types were not included in subsequent analyses because there was not a sufficient number of these call from which to base meaningful conclusions. Although the number of caller ID calls was similarly low, it included the highest number of calls that a customer requested a specific product or service, and was subsequently included to minimally represent this type of customer/service representative negotiation.

For each call, it is necessary to determine the prototypical screen flow (baseline) In other words, it is necessary to identify the primary screens that service representatives visit and in what order these screens are visited. A baseline can be determined by visually inspecting a sample of individual records of screen flows for a given calf type For example, about 10-12 records can be inspected to determine a baseline screen flow. This visual inspection should be conducted to identify patterns of the same screens that are visited in the same sequence. The result is an initial baseline screen flow from which all records of the particular call type may be compared. In this way, it is possible to assess the common screen flow pattern associated with a given call type. Many of the representatives also visited other screens during negotiations, but these screens were not visited with any regularity among representatives. These "tangents" that a given representative would make during a negotiation within the screen flow were also analyzed, but results did not show any distinctive patterns. Each record of screen navigation also included behavioral data such as the sequential occurrence of cross-selling attempts and sequential occurrence of when a representative used a "help aid" (help aids include: a calculator, help screens, assistance from a manager, etc.).

The methodology of applying CDM to interface design would proceed in the following manner: during the requirements gathering phase of the interface design, documents are generated that captured roadblocks to usability within the present system and alternative design ideas to address these roadblocks. These "paste-ins" provide the starting point to implement CDM to design. Specifically, each design idea and/or requirement should be rated in terms of accommodating the quantitative models of the user population. Each design idea and/or requirement would consist of a description of functionality and checked whether or not it accommodates a given CDM user population grouping (blue, yellow, etc). This may be expanded to include a description of how a given group's characteristics have been accommodated, or how a given group's characteristics have not been addressed to serve as a future aid to subsequent design enhancements. This could take the form of simply YES/NO binary coding, or as ratings based on subjective opinions of the designer(s) of the "level of accommodation". (1—not accommodated; 7—group's characteristics fully addressed). In addition, ratings should be made with reference to how an individual "fits" in with design requirement (micro implement) "fits"-in with the over-all workflow, and/or across screen navigation.

The advantages and benefits provided to the user of the present invention are numerous. Revenue generated per customer call should increase, since the sales/negotiation system is more customized to the individual user, reducing mental workload on the user and thus allowing for more emphasis on sales rather than navigation/system manipulation. Opposing behaviors are accounted for, which would increase the operational efficiency of the call center. For instance, the interface supports speed oriented behavior (high volume, short duration/low revenue calls) while simultaneously supporting service-oriented behavior (low volume, long duration/high revenue calls).

Also, a more customized system will maximize user-efficiency and thereby decrease unnecessary time-on-the-line and increase customer accessibility. Agents using this method could out-perform other similar agents at other organizations. Other organizations would still be attempting to meet the needs and preferences of their systems-users without a systematic method of accomplishing these requirements. Thus, the method of the present invention also represents an opportunity to distinguish the user of this method from all other carriers.

The user of this invention can benefit from strengthening its image with agents. It gives agents a reason to enhance their opinion of the user of the method of the present invention as a company that does adjust to employee's needs and capabilities. Thus, it is possible the user of this method may become the carrier of choice for the next generation and top performing agents. Finally, the method of the present invention allows agents to be compatible with Wireless, Long Distance, and other future services. The methodology of accommodating the range of behavioral diversity of systems users can be transferred and applied to different sales negotiation systems and interface development teams.

Although the invention has been described with reference to several exemplary embodiments, it is understood that the words that have been used are words of description and illustration, rather than words of limitation. The method disclosed can be used to design interfaces for a variety of systems, including but not limited to interactive telephone systems, interactive voice response systems, Internet based systems, interactive graphic user interface systems, automated teller machines, computer systems, television programming interfaces, and any other system which has an user interface.

Changes may be made, without departing from the scope and spirit of the invention in its aspects. Although the invention has been described herein with reference to particular hardware, software, means, and embodiments, the invention is not intended to be limited to the particulars disclosed herein; rather, the invention extends to all functionally equivalent structures, methods and uses, such as are within the scope of the appended claims.

What is claimed is:

1. A method for designing user interfaces for users in a user population, comprising:
   modeling behaviorally distinct groups of the users; and
   customizing the user interfaces based on at least one of interactive testing by the users and the modeling,
   wherein the user population is categorized into the behaviorally distinct groups of the users based on predetermined characteristics and behaviors of the users.

2. The method according to claim 1,
   wherein the users individually customize an implementation of the user interfaces.

3. The method according to claim 2, further comprising:
   integrating selected user customization into a design for the user interfaces.

4. The method according to claim 3,
   wherein the selected user customization comprises navigation preferences and information display choices.

5. The method according to claim 4,
   wherein the navigation preferences and the information display choices are stored in a user profile.

6. The method according to claim 4,
   wherein the navigation preferences and information display choices are provided for selection by the users based on at least one of the predetermined characteristics and behaviors for the behaviorally distinct groups of the users and business decisions.

7. The method according to claim 1, further comprising:
   determining prototypical navigation behavior.

8. The method according to claim 1,
   wherein the users are service agents.

9. The method according to claim 1, further comprising:
   re-categorizing the behaviorally distinct groups of the users when the predetermined characteristics and behaviors do not accurately describe the users.

10. The method according to claim 1,
    wherein design implementations for the user interfaces are tracked on either a micro level or a macro level.

11. The method according to claim 1,
    wherein the behaviorally distinct groups of the users are modeled using at least one of quantitative and qualitative models.

12. The method according to claim 11,
    wherein the at least one of quantitative and qualitative models is revised when the at least one of quantitative and qualitative models does not accurately describe the behaviorally distinct groups of the users.

13. A system for designing user interfaces for users in a user population, comprising:
    a modeler, implemented on at least one processor, that models behaviorally distinct groups of the users; and
    a customizer, implemented on at least one processer, that customizes the user interfaces based on at least one of interactive testing by the users and the modeling,
    wherein the user population is categorized into the behaviorally distinct groups of the users based on predetermined characteristics and behaviors of the users.

14. The system according to claim 13,
    wherein the behaviorally distinct groups of the users are modeled using at least one of quantitative and qualitative models.

15. The system according to claim 13,
    wherein the predetermined characteristics and behaviors are validated.

16. The system according to claim 13,
    wherein the user interfaces are customized based on emergent behaviors and preferences for the behaviorally distinct groups of the users,
    wherein the emergent behaviors and preferences are distinct from the predetermined characteristics and behaviors.

17. The system according to claim 13, wherein an output obtained from the at least one of quantitative and qualitative models is used to customize the user interfaces.

18. The system according to claim 13, wherein the user interfaces are rated based on a degree to which a quantitative model is accommodated.

19. The system according to claim 13, wherein customizing the user interfaces improves efficiency for responding to an incoming communication at a service center.

* * * * *

UNITED STATES PATENT AND TRADEMARK OFFICE
CERTIFICATE OF CORRECTION

PATENT NO. : 7,836,405 B2
APPLICATION NO. : 12/405713
DATED : November 16, 2010
INVENTOR(S) : R. Bushey et al.

Page 1 of 1

It is certified that error appears in the above-identified patent and that said Letters Patent is hereby corrected as shown below:

On the cover page, page 3, under FOREIGN PATENT DOCUMENTS, of the printed patent, add the following FOREIGN PATENT DOCUMENTS:
--GB 01/28396.9    05/00
  JP 2001-199299   07/01
  KR 2003-016896   03/03--

On the cover page, page 3, under OTHER PUBLICATIONS, of the printed patent, add the following OTHER PUBLICATIONS:
--CARD et al., The Psychology of Human-Computer Interaction. Hillsdale, NJ: Lawrence Erlbaum., (1983).
HART et al., Development of the NASA-TLX (Task Load Index): Results of Empirical and Theoretical Research. In P.A. Hancock and N. Meshkati (Eds.), Human Mental Workload. (pp. 139-183) Amsterdam: North-Holland, (1988).
JOHN et al., Using GOMS for User Interface Design and Evaluation: Which technique? ACM Transactions on Computer-Human Interaction, 3 (4). 287-319, (1996).
SHINGLEDECKER, Operator Strategy: A Neglected Variable in Workload Assessment, (1980).
English Language abstract of JP 2001-199299.
English Language abstract of KR 2003-0016896.
WIERWILLE et al., Recommendations for Mental Workload Measurement in a Test and Evaluation Environment. Human Factors, 35 (2), 263-281, (1993).
WEI, "Mental Load and Performance at Different Automation Levels." The Netherlands: Delft University, (1997).

Signed and Sealed this
Eighth Day of February, 2011

David J. Kappos
*Director of the United States Patent and Trademark Office*